(12) United States Patent
Alexander

(10) Patent No.: US 6,615,612 B2
(45) Date of Patent: Sep. 9, 2003

(54) ELECTROSTATIC BATCH PREHEATER AND METHOD OF USING THE SAME

(76) Inventor: Jeffrey C. Alexander, Flat I, 8 Mayfield Road, Tunbridge Wells TN4 8 ES (GB)

( * ) Notice: Subject to any disclaimer, the term of this patent is extended or adjusted under 35 U.S.C. 154(b) by 0 days.

(21) Appl. No.: 09/761,749

(22) Filed: Jan. 18, 2001

(65) Prior Publication Data

US 2001/0008076 A1 Jul. 19, 2001

(30) Foreign Application Priority Data

Jan. 18, 2000 (GB) .............................................. 0000969

(51) Int. Cl.⁷ .............................. C03B 5/237; C03B 3/02
(52) U.S. Cl. ........................ 65/27; 65/134.6; 65/134.8; 65/136.1; 65/335; 96/27; 96/62; 96/126; 96/150
(58) Field of Search ...................... 65/27, 134.6, 134.8, 65/136.1, 335; 95/61, 62, 110, 275; 96/27, 62, 126, 150; 423/240 S, 244.07, 244.08

(56) References Cited

U.S. PATENT DOCUMENTS

| | | | | | |
|---|---|---|---|---|---|
| 278,356 | A | * | 5/1883 | Niese et al. ................... | 34/170 |
| 3,842,516 | A | * | 10/1974 | Speissegger et al. .......... | 34/170 |
| 4,144,359 | A | * | 3/1979 | Zahedi et al. ................. | 427/474 |
| 4,149,858 | A | * | 4/1979 | Noack et al. .................. | 95/110 |
| 4,306,899 | A | * | 12/1981 | Richards ..................... | 65/134.3 |
| 4,308,036 | A | * | 12/1981 | Zahedi et al. .................. | 95/68 |
| 4,338,112 | A | * | 7/1982 | Propster ......................... | 65/27 |
| 4,349,366 | A | * | 9/1982 | Saeman ........................ | 65/27 |
| 4,349,367 | A | * | 9/1982 | Krumwiede ................... | 65/27 |
| 4,410,347 | A | * | 10/1983 | Krumwiede ................... | 65/27 |
| 4,582,521 | A | * | 4/1986 | Froberg ......................... | 65/27 |
| 4,696,690 | A | * | 9/1987 | Roloff ............................ | 65/27 |
| 4,940,478 | A | * | 7/1990 | Naber et al. ................... | 65/27 |
| 5,342,427 | A | * | 8/1994 | Alexander ...................... | 65/27 |
| 5,529,762 | A | * | 6/1996 | Alexander ............. | 423/244.07 |
| 5,773,529 | A | * | 6/1998 | Alexander ................... | 65/168 |

* cited by examiner

*Primary Examiner*—Sean Vincent
(74) *Attorney, Agent, or Firm*—Connolly Bove Lodge & Hutz LLP

(57) ABSTRACT

A method and apparatus is taught for preheating of glass batch materials by direct contact with glass furnace exhaust gases. Furnace gases 15 flow through a batch hopper 1 in horizontal tunnels formed by open bottom tubes 6, with a free surface of batch forming the bottom portion of the tunnel. The tubes are electrically grounded and a high voltage discharge electrode 18 is located axially in each tunnel. The corona discharge from the electrode acts to retain batch and prevent it's entrainment into the flowing gases. Particulate matter from the gases is simultaneously precipitated onto the batch surface. Acidic gas components such as $SO_2$, HCl, and HF are chemically reacted with batch constituents, thereby removing them from the gas stream. Heat is transferred from the gases to the batch by direct contact. Cooled gases 16 exit the hopper, cleaned of pollutants to levels in compliance with strict environmental regulations.

32 Claims, 8 Drawing Sheets

ELECTROSTATIC BATCH PREHEATER AND METHOD OF USING THE SAME

BACKGROUND

The invention relates to a method and apparatus for preheating raw materials for glass production using waste heat from the glass melting process. The invention uses electrostatic forces to improve the performance of conventional methods of preheating glass batch materials. Additionally, the electrostatic forces act to remove fine particulate matter from the glass furnace exhaust gases, thus achieving simultaneous pollution emission reduction.

Glass is made by heating and melting a mixture of solid raw materials to a liquid state. The melting is done inside of a furnace and necessarily requires substantial amounts of heat. Typically, this heat is generated by the combustion of fossil fuels with the exhaust gases from the combustion leaving the furnace. Exhaust gas temperatures immediately after the furnace are quite high, typically 1300–1450° C. Combustion air preheaters are normally included which recover some of the heat in these gases. Even so, gas temperatures at the discharge to atmosphere are quite high, thus substantial amounts of heat are wasted. The cost of fuel for the furnace is a major component in the cost of making glass.

The raw materials for glass are typically called batch. The word frit generally refers to an assemblage of various pulverous materials including silica sand, limestone, soda ash, salt cake, and a variety of other minor ingredients. The material and mixture ratios are carefully chosen to produce glass of the desired properties and quality. Generally these materials are prepared in a finely divided form to promote their melting rates. Sizes are typically 100 to 200 $\mu$m diameter with a maximum size of 1 mm. Also, recycled glass, either from the factory or from external sources, is used as a raw material. This recycled glass is called cullet. For ease of handling cutlet is generally crushed to sizes less than 50 mm before use in the glass furnace. Sometimes, cullet is pulverised to sizes similar to the other raw materials. For the purpose of further description, the word batch will be used to mean frit alone, cullet alone, or a mixture of frit and cullet, the cutlet being either crushed or pulverised.

Glass furnaces emit various pollutants with their exhaust gases, most commonly particulate matter (fine dust) and $SO_2$. The particulate matter is especially difficult to collect because it is of diameter less that 1 $\mu$m and the exhaust gas temperatures are high. Typically very large electrostatic precipitators are utilised, often preceded by absorption towers for chemical reaction of various reagents with the $SO_2$ pollution. Other gaseous pollutants are sometimes present, specifically, HF and HCl acid gases. Many local regulations require reduction of the amounts of these pollutants that are emitted to the atmosphere.

DESCRIPTION OF PRIOR ART

The most relevant prior art is "Method and Device for Preheating Raw Materials for Glass Production, Particularly A Cullet Mixture", U.S. Pat. No. 4,696,690. A brief description of this device is beneficial to an understanding of the present invention. In this device, furnace exhaust gases are passed through "flow ducts" inside of a batch bunker. The upper half of the flow ducts are formed by equal sided angle sections arranged to form a roof like structure inside the bunker. The angles provide an open bottom and the batch itself forms the bottom half of the flow duct, due to its angle of repose under the roof.

Batch is introduced to the bunker through its open top. The batch is moved downward by gravity, thus providing continuously renewed surfaces in the flow ducts that are exposed to the furnace exhaust gases. Heat is transferred to the batch primarily because of the direct contact with the hot gases.

The flow ducts are arranged in horizontal banks, with the furnace gas divided to flow through the ducts of a given bank in parallel. Multiple banks of flow ducts are provided one above another and internal tunnels are provided to direct the flow successively from the lower banks to the upper banks. The result is to achieve a countercurrent flow of hot gases with the downward moving batch in the bunker. Batch is fed out of the device through a nozzle as controlled by a conventional device such as a vibratory, screw, or other mechanical type feeder.

Such devices have been successfully and reliably operated, but have found limited applicability in the glass industry. Preheating of batch and reduced fuel consumption of the furnace have been well demonstrated. As well, partial removal of $SO_2$, HCl, and HF has been realised. The fundamental limitation of the device is that dust from the batch material is entrained in the furnace gases flowing through the flow ducts. This entrainment can be minimised by reducing the gas flow velocity in the ducts, but such an approach greatly increases the size and cost of the device. Typically, electrostatic precipitators have been installed downstream of the device, in order to capture the entrained dust and prevent its release to atmosphere. However, such an amalgamation results in an expensive overall installation. The economic benefits of preheating the batch materials cannot justify the full installation cost of the equipment.

What is needed is an improvement to the device to allow it to operate without entrainment of dust. Furthermore, in cases where the glass manufacturing process is faced with governmental legislation to reduce pollutant emissions from the furnace, a device capable of simultaneous particulate matter and SO2 removal from the furnace exhaust gases to meet these regulations would eliminate the need for additional pollution control equipment. Then, the process of this invention would result in an overwhelming economic justification for installation. This is the motivation and result of the invention described here.

SUMMARY OF THE INVENTION

In view of the foregoing, the following are objects or benefits of the described embodiment of the present invention:

1. Preheat batch material for use in a glass-melting furnace using heat from the furnace exhaust gases by direct contact with the gases.
2. Eliminate carryover of dust with the gases leaving the direct contact process.
3. Simultaneously remove fine particulate matter from the incoming gases, thus achieving a reduction of a pollution emission.
4. Simultaneously remove gaseous pollutants, which might be components of the incoming gas, from the incoming gases by chemical reaction with a constituent of the batch and formation of a solid reaction product.
5. Optimise efficiency of the process by operating with high gas velocity and countercurrent flow of gas and solids.

One aspect of the present invention is directed to a method or process for achieving the above-described objects that can be described as including the following steps:

a) providing a bulk quantity of glass batch material in a hopper;

b) providing at least one gas flow tunnel through the bulk quantity of batch material, said tunnel is of cylindrical shape and is generally horizontally disposed within the hopper;

c) the top portion of the cylindrical tunnel consists of electrically conductive plates forming roofs within the bulk material and in contact with said batch material;

d) said roofs are arranged so that the bottom portion of the cylindrical tunnel consists of batch material residing at its gravitational angle of repose beneath the roofs;

e) passing glass furnace exhaust gases through said tunnel;

f) providing an electrically conductive electrode within said tunnel;

g) applying an electrical potential difference between said electrode of step f) and said roofs of step c) of sufficient magnitude to produce corona discharge inside the tunnel, said corona discharge consisting of a flow of gaseous ions through the furnace gases, at least a portion of said gaseous ions flowing into the glass batch material;

h) supplying unheated batch material to the top of said hopper; and i) removing heated batch material from the bottom of said hopper so that the batch material moves through the hopper by action of gravity.

Another aspect of the present invention is directed to an apparatus for carrying out the foregoing process.

In another embodiment of the invention, fine dust pollutants in the gases are removed from the gases by electrostatic precipitation onto the inside of said flow tunnels, including precipitation directly onto the batch surface, and are subsequently removed from the hopper along with the batch material.

In still another embodiment of the invention, gaseous pollutants introduced with the gases are chemically reacted with a constituent of the batch material to form a solid reaction product that is removed from the hopper with the batch material.

In still another embodiment of the invention, a plurality of such tunnels is provided, the gases are first introduced to the tunnels near the bottom of the hopper and are finally removed from tunnels near the top of the hopper. Gases are directed to flow successively through the tunnels, or banks of tunnels, from the bottom to the top of the hopper. The batch is introduced at the top and removed from the bottom of the hopper so that the gas and batch flow in direction generally countercurrent to each other.

The invention can be advantageously used to preheat the batch using heat from the exhaust gases. By preheating these materials before they are introduced to the furnace, the amount of fuel required for heating and melting them in the furnace can be reduced. This fuel reduction can represent a substantial economic benefit to the glass making process and also reduces the emission of the so-called green house gases (such as NOx and $CO_2$) simply because less fuel is burned. Simultaneous with this preheating, pollutant emissions such as fine dust, $SO_2$, HCl, and HF can be reduced with high efficiency to satisfy stringent regulations. $SO_2$, HCl, and HF emissions can be reduced because most glass batch contains substantial amounts of material which is chemically reactive with these acid gases, specifically soda ash ($Na_2CO_3$) and limestone ($CaCO_3$).

Fossil fuel fired glass furnaces are of several different designs. When air is combusted with fuel, the air is typically preheated in regenerative or recuperative heat exchangers, utilising some of the waste heat exiting the furnace. As well, nominally pure oxygen can also be used for combustion, in which case no waste heat recovery equipment is typically involved.

While the invention could be advantageously applied to any of the glass production schemes, its benefits are greatest in the case of oxygen-fuel fired furnaces. This is because exhaust gas temperatures are higher, thus batch can be preheated to high temperatures, and because reduction in fuel requirements for the furnace is accompanied by a proportional reduction in the oxygen supply (and thus cost) for the furnace.

DESCRIPTION OF THE FIGURES

The above and other aspects of the present invention will now be described in further detail, by way of example only, with reference to the accompanying drawings, in which.

DETAILED DESCRIPTION OF THE INVENTION

Figure 1:
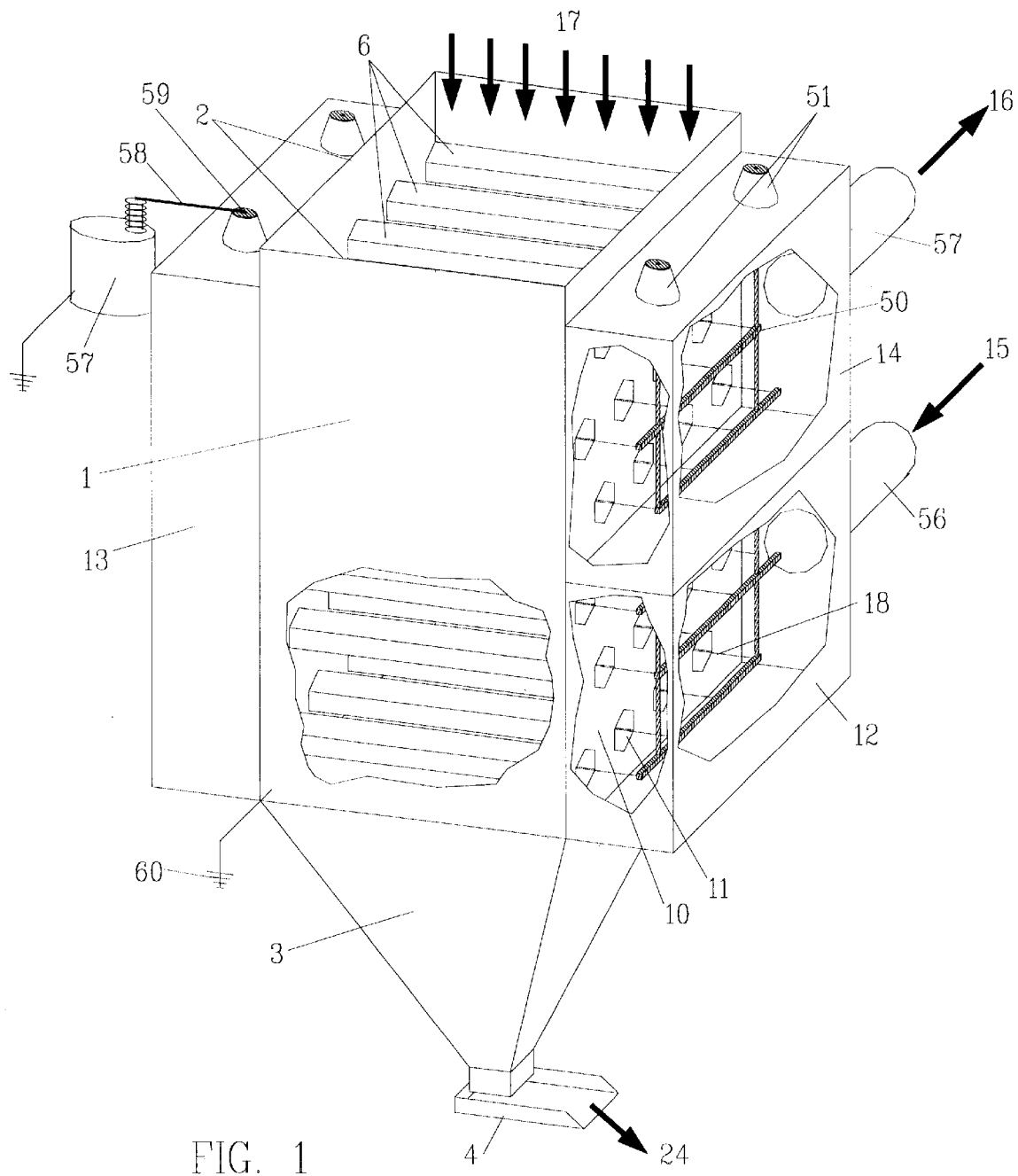
FIG. 1 is a cut-away perspective view of a preferred embodiment of a preheater in accordance with the present invention.

The present invention is referred to as the Electrostatic Batch Preheater, or E-Batch preheater. A preferred embodiment is depicted in FIG. 1, which is a perspective cut-away view of the device. A bulk quantity of glass batch material (not shown in FIG. 1) fills a hopper 1. The hopper will generally have a square or rectangular plan view cross section 2. At the bottom of the hopper, a second pyramid shaped discharge hopper 3 allows for material discharge 24 via feeder 4 to produce a substantially uniform flow of the material in the hopper. Such technology for achieving "mass flow" in hoppers is well known in the art. Batch material is uniformly supplied 17 across the top of the hopper by conventional silo and material handling means. Generally, the hopper 1 is maintained in a full condition.

Figure 2:
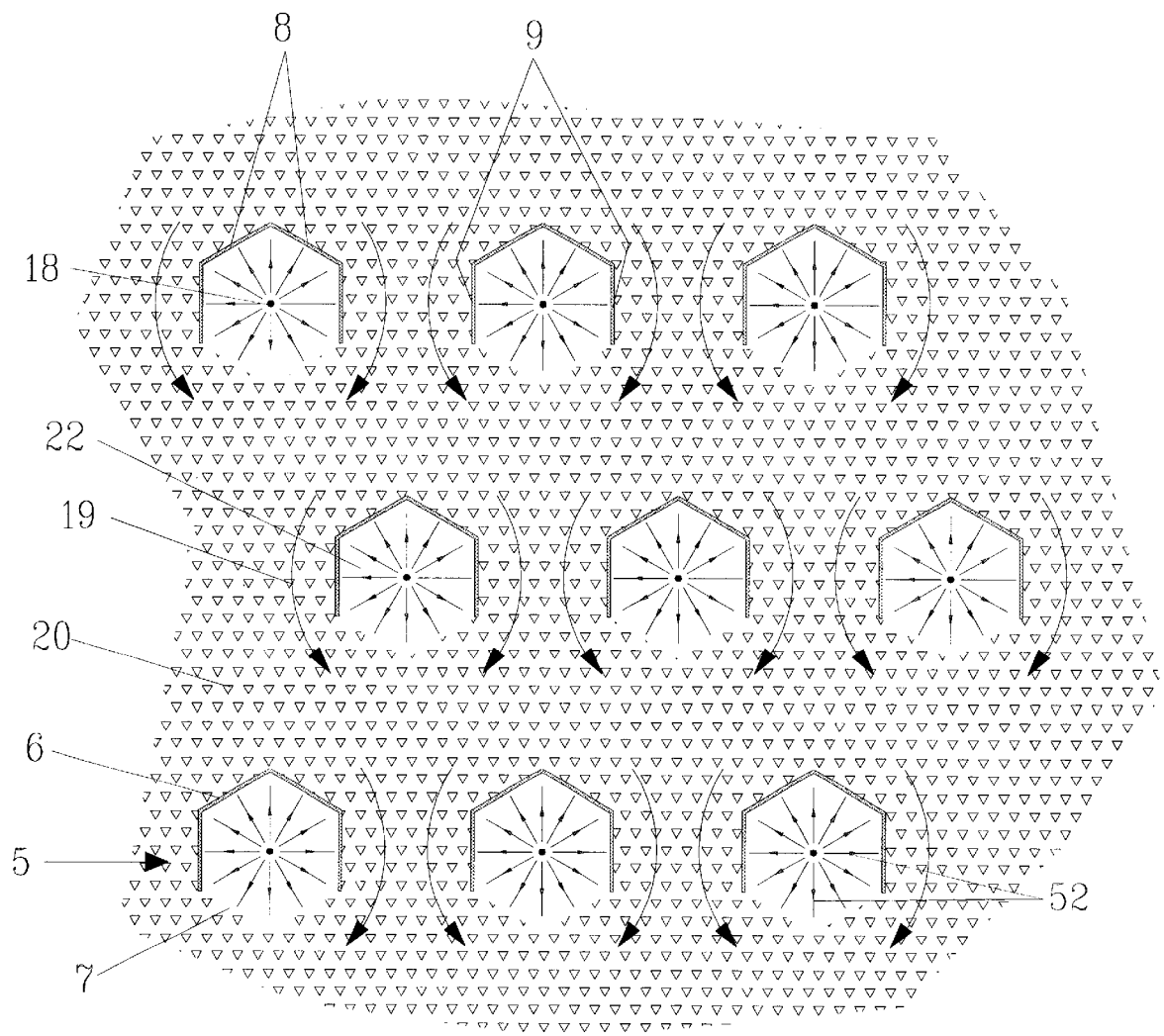
FIG. 2 is a cross sectional view of the interior of the preferred embodiment.

Rows 5 of internal flow tunnels 22 are created inside the main hopper by providing specially designed structures that are best understood with additional reference to FIG. 2. FIG. 2 is a cross sectional view of the interior of hopper 1. Horizontal open bottom tubes 6 form the open tunnels 22 in the bulk quantity of batch material 20. Batch material fills below the tube at its natural angle of repose to form a surface 7, thus the batch material itself completes the tube circumference. FIG. 2 shows a hexagonal tube design, with the batch material forming two flat surfaces 7 at its bottom. The two top 8 and two side 9 surfaces of the hexagon are typically metallic plates. The material angle of repose is typically about 30° from the horizontal, so the use of hexagonal geometry maintains good symmetry of the entire flow tunnel. The symmetry is important for the uniform generation of corona discharge within the tunnels as will be explained later. Other tube geometry's could also be used effectively, such as circular cylindrical.

The tubes are extended to a wall 10 of the main hopper and a suitable hole 11 is cut into the hopper wall to allow communication of each tunnel interior with the outside of the hopper for flow of gases. Both ends of the tubes are so constructed, thus allowing a free passage for gas flow through the entire width of hopper 1. Many such rows of tubes are typically provided.

Plenum structures 12, 13, and 14 are provided exterior to the hopper and they allow for the desired routing of gas flow through the device. Hot gases 15 from the glass furnace are directed to the inlet plenum 12 via inlet pipe 56. This inlet plenum 12 encloses several rows of the flow tunnels. This assemblage of rows of tunnels is termed a bank of tunnels. The plenum design is made so that the gases divide approximately equally and flow through all the tunnels of a given bank enclosed by the plenum. After the gases flow through this initial bank of tunnels, a second plenum 13 is provided to gather the gases and then direct them to another bank of tunnels immediately above the first. After passage through this second bank of tunnels, the gases collect in the outlet plenum 14. Cooled gases 16 are then discharged from the device via outlet duct 57.

Although only two banks of tunnels are shown in FIG. 1, in practical use, several such banks of tunnels can be provided at successively higher levels in the hopper. Additional plenums will direct gases to flow successively through the additional banks of tunnels.

As batch material 20 is fed out 24 of the bottom of the device via feeder 4, the entire bulk of batch material in the hopper moves 19 in a creeping fashion in the hopper and past the tunnels. This motion results in a continuous renewal of the surface 7 of batch material exposed on the inside of the flow tunnel. If alternate rows of the tunnels are provided with staggered centres, as shown in FIG. 2, the complete volume of batch material can be exposed to hot gases as the material flows through the hopper. Heat from the gases is transferred to the batch material by this direct contact. As well, $SO_2$, HCl, and HF are chemically reacted with constituents of the batch material to form solid reaction products. In this way, these gaseous pollutants are removed from the furnace gases.

Thus far, the invention description is somewhat different, but still consistent with the prior art. However, a fundamental limitation of the prior art is the fact that any batch material supplied to the hopper will contain a certain amount of fine dust. When this fine dust is contacted with the flowing gases in the tunnels, the dust is entrained in gas flow and carried out of the hopper. Gases 16 exiting the device show a substantial loading of dust carried over from the batch in the device. This carryover is not acceptable, as its discharge to atmosphere constitutes a pollution emission.

Furthermore, the heat transfer rate from gas to batch is relatively low, thus necessitating a relatively large device. In order to minimise the above mentioned dust carryover, gas velocities in the tunnel must be kept low. Such low flow velocities exhibit a gas flow pattern with a significant "boundary layer" of very low gas velocity near the surfaces of the tunnel. Essentially, heat must diffuse through this boundary layer of nearly stagnant gas in order to heat the batch. This is the primary limitation on heat transfer rate of the device. This aspect forces the process designer to provide a very large device to achieve the desired batch preheating, thus the cost of the unit is high.

The mass transfer rate of pollutant gases to contact the surface of the batch material is low for similar reasons, thus the removal efficiency of gaseous pollutants is generally less than to achieve outlet levels less than those mandated by governmental authorities.

The inventive aspect of the E-Batch Preheater is now further described.

Each of the tunnels is provided with a discharge electrode 18 axially aligned and centrally located within the tunnel. A simple wire is shown, but other designs incorporating sharp points for generation of corona may be used. The wires 18 for a given bank of tunnels are connected together at either end by brackets 50 and electrical insulators 51 support the brackets. Such insulators are typically of ceramic construction. Similar brackets (not shown) are provided in plenum 13. The wires and brackets are thus electrically isolated from the plenums 12, 13, 14 and hopper 1. Such arrangements and designs of brackets and insulators are well known to those skilled in the art of electrostatic precipitation.

A high voltage DC power supply 57 is connected 58 to the brackets via the bracket extension 59 through the support insulator. One power supply can be used for the entire unit, or alternatively, separate power supplies can be supplied for each bank of tunnels. The hopper is electrically grounded 60. The electrically conducive plates 8 and 9 of each tube are connected to the hopper wall 10 and thus are also electrically grounded.

The high voltage DC power supply 57 serves to apply a high voltage to the discharge electrodes 18. Application of high voltage of sufficient magnitude to the discharge electrode 18 will produce a corona discharge 52 inside of the tunnel as depicted in FIG. 2. The corona discharge is well known to those skilled in the art, so extensive description of the corona process is not necessary. The corona process produces a flow of gaseous ions from the discharge electrode towards the grounded surfaces surrounding the electrode. The metallic tube is electrically conductive and is grounded, so it provides an easy path for the ions to flow to ground.

Figure 3A:
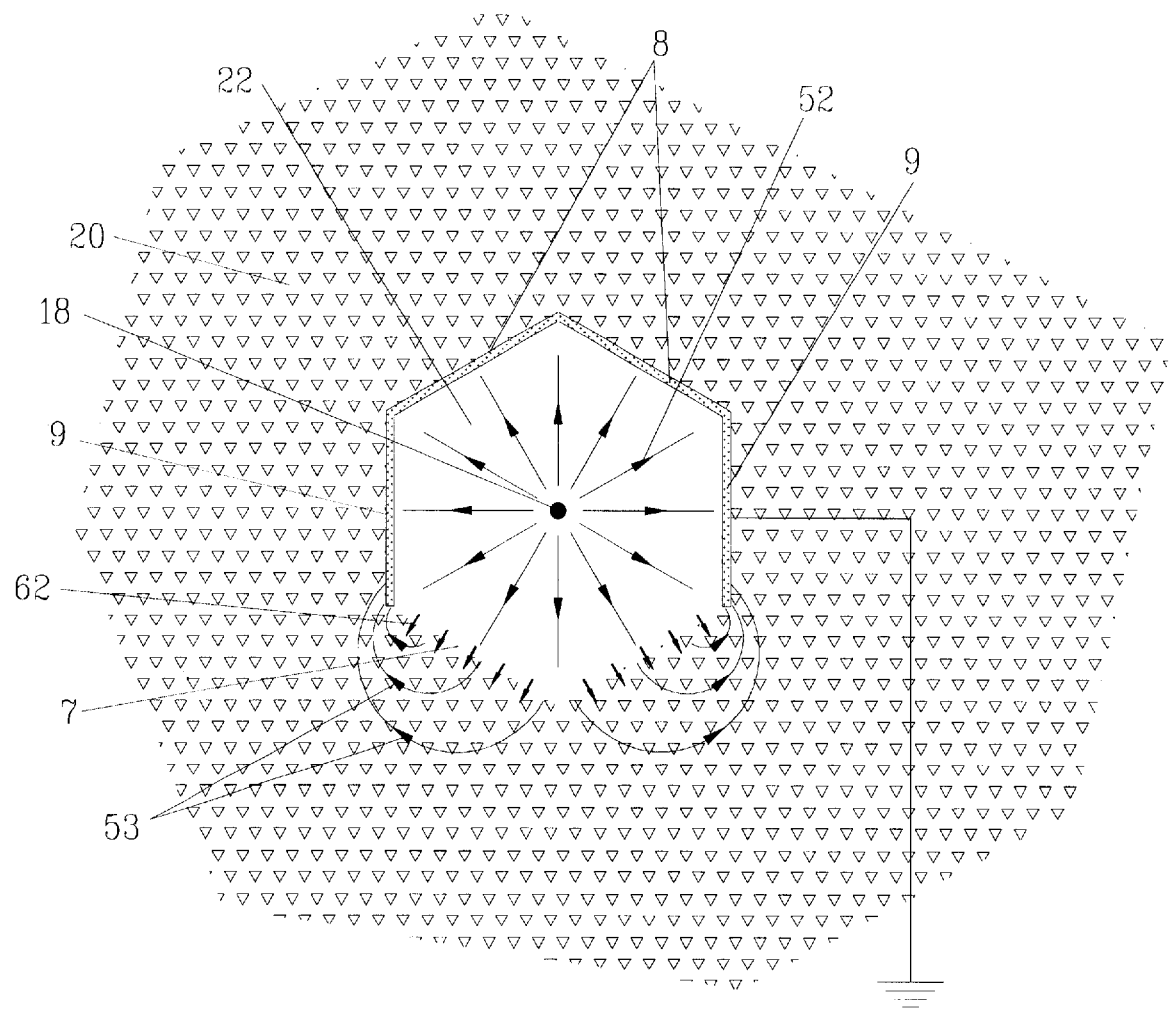
FIGS. 3A and 3B are detailed views of the cross section of a single tube showing electrical current flows.
Figure 3B:
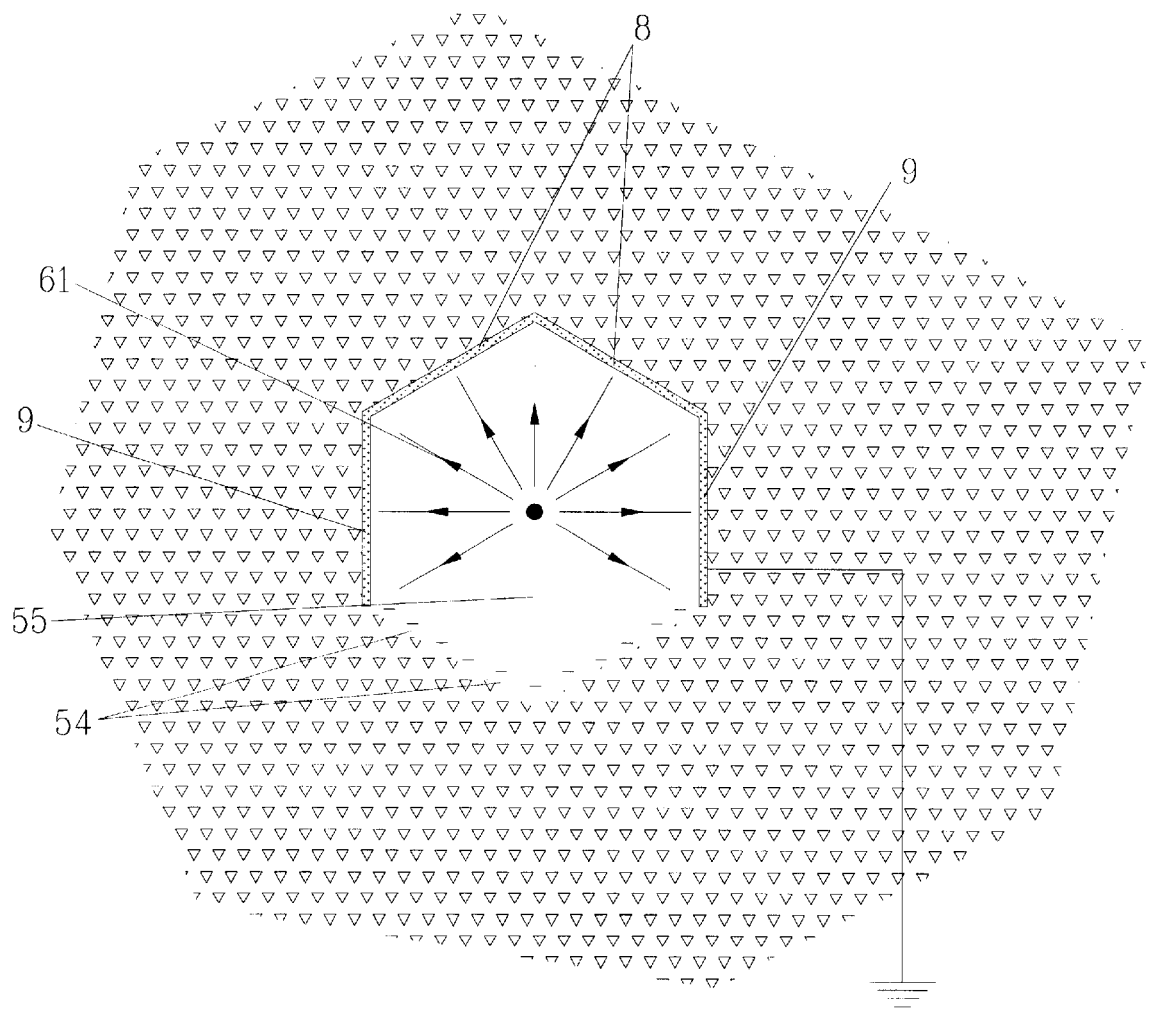

It has been found that the corona discharge ion flow can also be directed towards the batch material surfaces 7 of the tunnel. These ions 53 then flow through the bulk of the batch material into the metal tubes and then to ground as depicted in FIG. 3A. This can occur provided the batch material is of sufficiently low electrical resistivity, as is the case of FIG. 3A. However, if the batch material were of high electrical resistivity, as depicted in FIG. 3B, electrical current could not flow through the batch. The ions from the corona would then produce a build up of electrostatic charges 54 on the batch surface. Since a negative corona discharge polarity is normally used in electrostatic precipitation, the example here uses negative polarity. The same operation and analysis would also apply for positive polarity. This charge build-up would then prevent the continued flow of ions to the batch.

In the case of high resistivity, the electrostatic charge build-up 54 would quench the corona discharge, and the flow of corona gaseous ions would stop. This would produce a quiescent region 55 in the tunnel that would be free of corona discharge ion flow. However, corona discharge ion flow would continue in the regions adjacent to the electrically conductive plates 8 and 9 as depicted in FIG. 3B. If the resistivity of batch material were very high, such charge build-up would result in the well-known "back-corona" effect that can plague operation of electrostatic precipitators. At these very high resistivities, the charge build-up 53 is so great that a secondary corona discharge is generated from the surface of the resistive material, emitting positive ions into the gas. These positive ions will flow back towards electrode 18 and effectively cancel out the normal negative corona discharge ion flow. In such cases, the electrostatic precipitator exhibits tremendously increased spark-over rates at reduced voltages. Precipitation performance is dramatically reduced. Generally, the limiting bulk electrical resistivity for this phenomenon is about $10^8$ Ω-meter.

In the case where the electrical resistivity is not too high, gaseous ions 52 from the corona discharge flow through the surface of the batch 7 in the tunnel, the resulting current flow 53 through the material generates an electrical field that is aligned with the current flow. It is well understood that the electric field generated in the batch material is related to the current flow density and the bulk electrical resistivity of the batch material by Ohm's law:

$$E_b = J_b \div \rho_b$$

Where;
$E_b$=electric field strength (Volts/meter)
$J_b$=electric current density (Ampere/sq. meter)
$\rho_b$=batch material bulk resistivity (Ω-meter)

Such an electric field in turn produces a compressive force within the material, in effect a cohesive force.

$$F_b = \in_b \times E_b^2$$

Where;
$F_b$=cohesive force (Newton/sq. meter)
$\in_b$=bulk dielectric constant of batch material (farads/meter)

By conservation of charge, the electrical current density Ji of the gaseous ion flow towards the batch surface must equal the electrical current density Jb through the batch material.

$$J_i = J_b$$

Where:
$J_i$=corona current density at batch surface (Ampere/sq. meter)

Using Ohm's law, we can express the cohesive force of material on the batch surface in terms of the corona discharge ion current density:

$$F_b = \in_b \times (\rho_b \times J_i)^2$$

This force 62 is directed perpendicular towards the free surface 7 of batch material and will thus act to defeat the entrainment of dust from the batch into the gas flow. The equation demonstrates that the cohesive force is strongly dependent upon both the resistivity of the batch material and the corona discharge ion current density.

Generally it can be said that the batch must have sufficiently low electrical resistivity that corona current flow will pass through material to the grounded tubes. Generally, we can say that this resistivity must be below $10^8$ Ω-meter.

Electrical resistivity of batch is primarily a function of the chemical composition of the batch and the temperature of the batch. Typically, batch is a blend of several ingredients, and the resistivity is also a function of the physical disposition of the various chemical constituents in the blend. The primary means of electrical conductance in batch is ionic conduction through the sodium constituents of the batch which is temperature dependent. At temperatures above about 200° C., soda ash generally provides sufficient electrical conductivity that the resistivity remains below the critical $10^8$ Ω-meter. In dry air, the resistivity increases monotonically with decreasing temperature and below about 200° C. the resistivity would rise above the critical point.

In the presence of furnace exhaust gases, however, the resistivity curve follows the dry air curve for higher temperatures, but for temperatures below about 200° C. the resistivity actually decreases with decreasing temperature. The reason for this is that furnace gases typically contain high amounts of water vapour and trace amounts of acidic gases. Below temperatures of about 200° C., acid will condense onto solid surfaces, the so-called acid dew point. At first, only minute amounts of acid condense on the solid surface, but this minute surface film is enough to provide some electrical conductance. Effectively the electrical conductance mechanism switches over from ionic conduction through the sodium constituent of the batch to surface conduction through the acid film on the surface of the batch particles.

Because the electrical resistivity of batch is below the limit imposed by back-corona, but still high enough to produce strong cohesive forces at the batch surface 7, entrainment of dust from the batch can be eliminated.

Such a strong cohesive force will prevent the entrainment of dust and other batch particles into the gas flow. This allows the E-Batch to be designed with gas flow velocities significantly greater than those of prior art. Higher gas velocity means that a smaller device can be provided to handle the same amount of gas flow and thus solids flow.

As well as providing a cohesive force to the batch material and preventing entrainment of dust into the flowing gases, the corona discharge will provide two other important functions. First, it will electrostatically charge any fine particulate matter in the furnace exhaust gases and then force them towards either the interior surfaces of the metallic tubes 8 and 9, or the surface 7 of the batch material. This is conventional electrostatic precipitator operation. Generally, if enough collection surface area is provided, the fine particulate matter will be precipitated from the furnace gases with high efficiency.

Second, the gaseous ion flow in the corona discharge produces intense fine scale turbulence in the gas. Such turbulence has the effect of improving both heat transfer rates and mass transfer rates from the flowing gases to the batch material surface. This will have the effect of increasing the preheat temperature of the batch exiting the device and increasing the removal of gaseous pollutants from the furnace gases by chemical reaction with the batch material. As described previously, heat and mass transfer rates are typically limited by the formation of a gas flow "boundary layer" near a solid surface. Gas velocities are low in this boundary layer, and the layer becomes the bottleneck in the heat or mass transfer processes. Heat or mass must then diffuse through the layer at a very slow rate. The corona-induced turbulence is especially effective at significantly reducing the thickness of this boundary layer, thus increasing transfer rates. Thus, compared to prior art, the E-Batch process can achieve better batch preheating and better gaseous pollutant removal in a physically smaller device.

Figure 5:
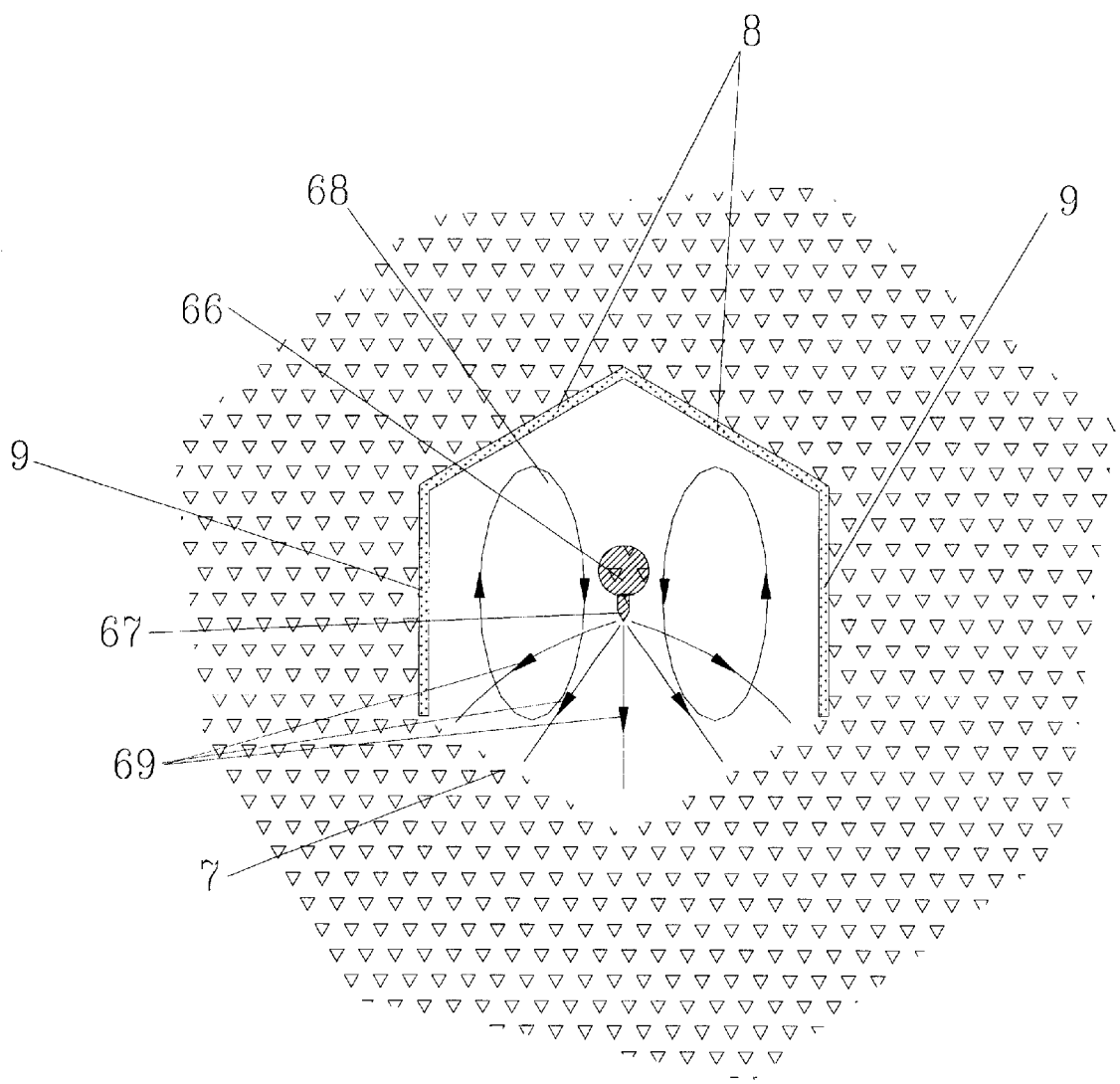
FIG. 5 is a detailed cross sectional view showing alternate design of discharge electrode and gas flow pattern.

This corona-induced turbulence is commonly known as corona wind. It results from the fact that the gaseous ions being electrostatically propulsed through the gas actually create a drag on the surrounding gases and set them in motion. This effect can be optimised by suitable electrode design, for cases where still higher heat and mass transfer rates are desired. Reference is made to FIG. 5, which shows an improved electrode design to optimise corona-induced turbulence for heat and mass transfer.

The wire is replaced by a bar 66 of large enough diameter that little corona is produced from its surface. For typical applications, the interior cross sectional dimensions of the tube might be 6 to 12 inches. Such a bar then might be of ½ to 2 inch diameter. Sharpened needlepoint's 67 are affixed to the bar at regular intervals and are pointed towards to the batch surface 7. Spacing between adjacent needlepoint's might be in the range of 1 inch to 6 inches. The provision of the needlepoint results in localised generation of corona discharge at the needle tip 67, with the gaseous ion flow 69 being almost entirely toward the batch surface 7. The other regions 68 of the tunnel are essentially quiescent with respect to gaseous ion flow. Such an arrangement has two benefits.

First, all the corona discharge ion current flow is directed into the batch. Then the cohesion force at the batch surface 7 will be greater than if the ion current were uniformly distributed around the entire circumference of the tunnel.

Second, the non-uniform corona ion flow will create a corona-induced gas flow pattern 70 inside the tunnel, with gas velocity directed toward the batch surface 7. Such a gas circulation will carry gases from the entire tunnel cross section towards the batch surface 7. This will greatly improve the desired heat and mass transfer processes.

Figure 4A:
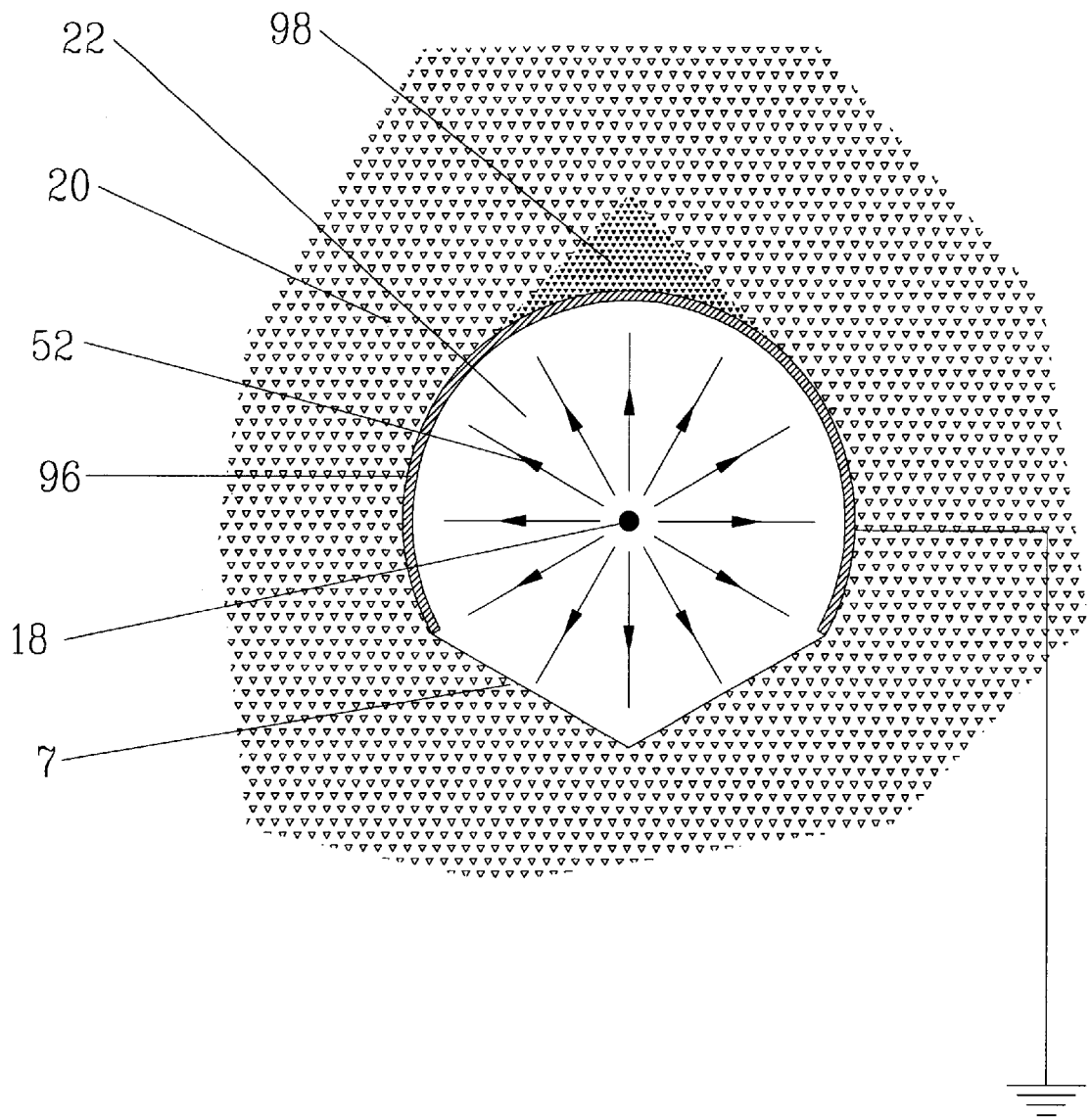
FIGS. 4A and 4B are detailed cross sectional views of alternate designs for the tubes.

Other geometry's can be used for the electrically conductive tube, as depicted in FIG. 4A. Here a circular cylinder 96 with a lower section removed is provided. The size of the opening is chosen so that the batch material surface 7 most nearly completes the circle. This geometry provides the most uniform distribution of corona discharge 52. Other details are the same as for the description of previous geometry.

Figure 4B:
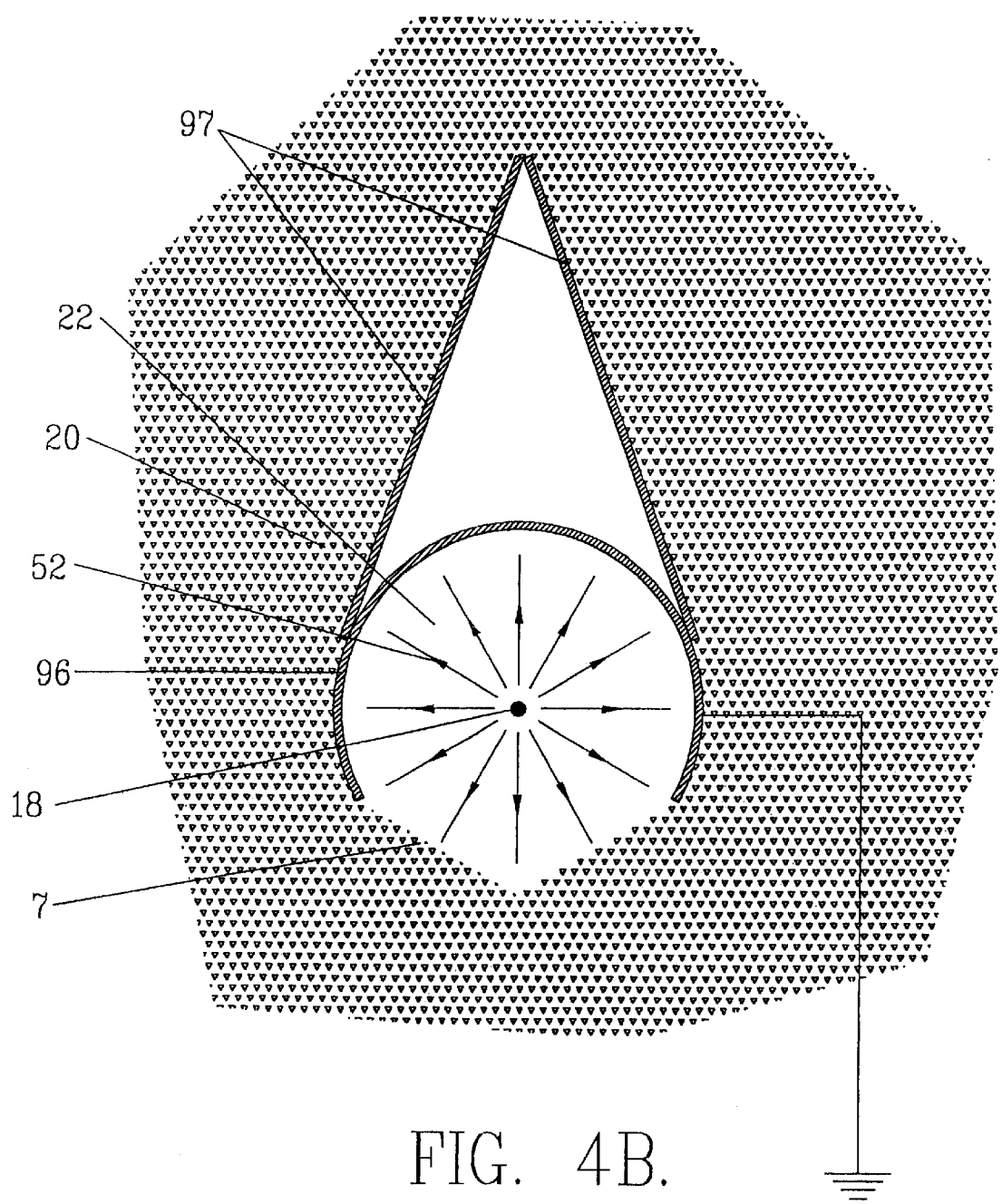

As well, various types of baffles can be provided to promote good flow of the batch material, as depicted in FIG. 4B. Here, steeply sloped baffles 97 immediately above tube 96 eliminate the possibility of stagnant batch material 98 directly on top of tube 96. Such stagnant areas can create large agglomerates of batch that can dislodge and then obstruct proper material flow through the hopper.

DESCRIPTION OF APPLICATION TO GLASS FURNACES

The object of the invention is to preheat batch material for use in a glass furnace, with simultaneous reduction of pollution emissions in the exhaust gases. As previously mentioned, the benefits of the E-Batch process are greatest in the case of oxygen-fuel fired furnaces because:

1. the exhaust gases are at higher temperatures than other types of furnaces, and
2. the preheating of batch reduces the requirements for both fuel and oxygen to the furnace, thus saving the costs associated with both.

The description of preferred application to glass furnaces will therefore be made in the context of oxygen-fuel fired furnaces, but the E-Batch process has similar applicability to regenerative or recuperative air-fuel fired glass furnace.

Glass melting furnaces operate under extreme conditions of temperature while maintaining very precise operating conditions. Exhaust gases are hot and chemically aggressive. The batch material consists of an amalgamation of several components of varying chemical and physical composition that are reactive, abrasive, hygroscopic and prone to dusting. Equipment applied to glass furnaces, especially one handling both the batch material and the exhaust gases, must be simple and reliable. This description is important because the advantage of the E-Batch process, compared to the alternatives, becomes apparent when its full integration with the glass manufacturing process is understood.

Figure 6:
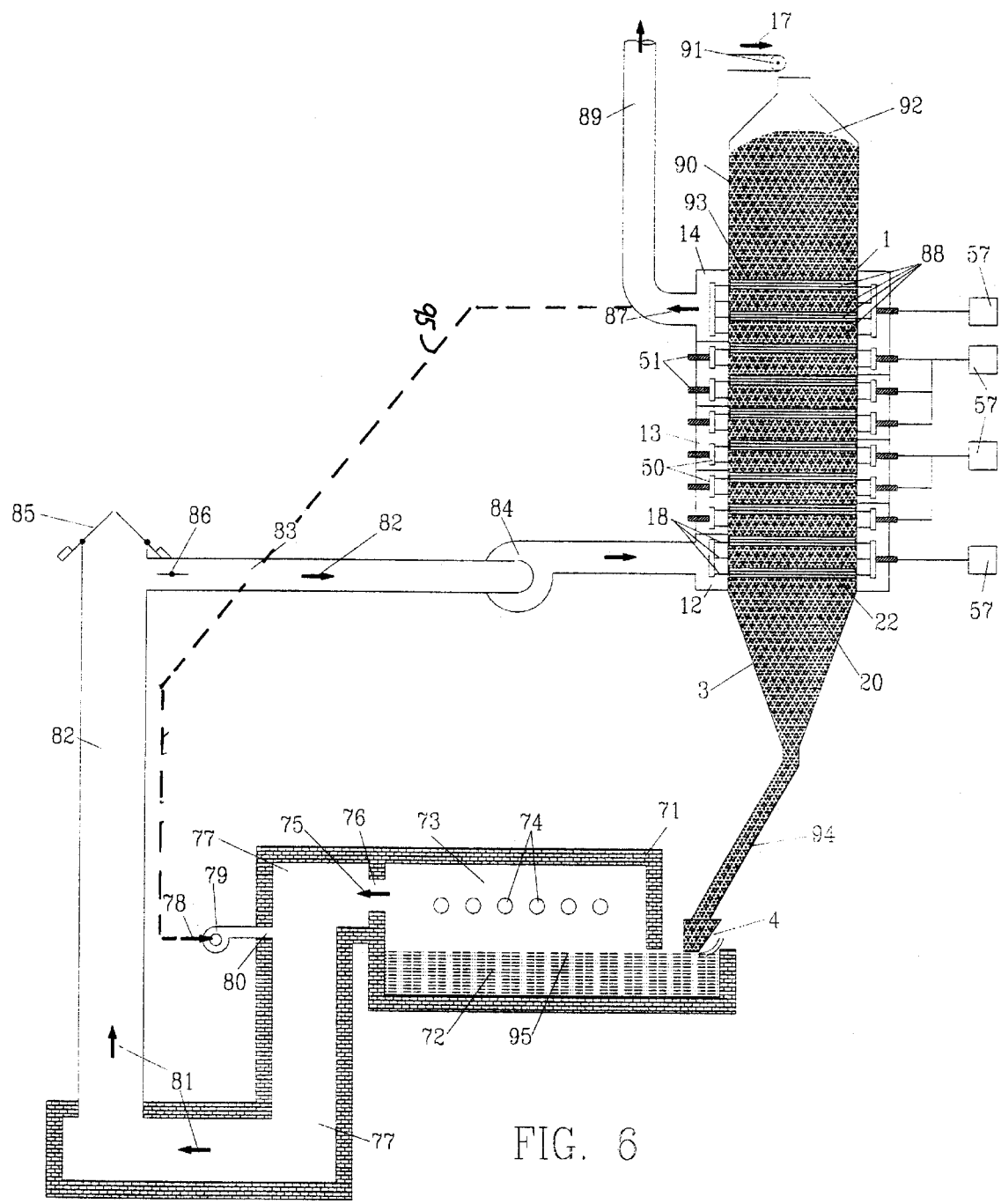
FIG. 6 is a process flow diagram showing application of the preferred embodiment to a glass melting furnace.

Reference is made to FIG. 6. The glass furnace 71 is a refractory brick structure enclosing a pool 72 of molten glass and a combustion space 73. Burners 74 are supplied with oxygen and fuel and produce flames inside the combustion space. Heat from the flames melts the glass 72. Molten glass exits the furnace through ports not shown in this diagram. Batch material is fed into the furnace via charging machine 4. Many types of charging machines are commonly used, including vibratory feeders, screw feeders, reciprocating pushers, etc. Batch material is fed into the furnace at variable rates in order to maintain a constant top 95 level of molten glass 72 in the furnace. As such, feeder 4 must be capable of providing batch to the furnace at variable rates.

The effect of preheating batch is to reduce the firing rate of the burners in the furnace. Preheated batch requires less energy to melt than unheated batch. Reducing the firing rate of the burners reduces both the amount of oxygen and the amount of fuel required by the burner.

Exhaust gases 75 from the combustion space exit the furnace through port 76 and enter flue channel 77. These exhaust gases 75 are typically at temperatures of 1300–1400° C., so the flue channel must also be constructed of refractory brick material.

Batch material typically begins to melt at temperature of about 600° C. If this melting were to occur inside the E-Batch preheater, the batch would stick together and to the metal surfaces of the device, which would render the device non-operational. In order to prevent overheating of the batch, the hot gases from the furnace must be tempered before introduction to the E-Batch device.

Tempering air 78 is injected into the flue channel by fan 79 through port 80. The air 78 mixes with the furnace gases 75 to produce tempered exhaust gases 81 in a lower portion of the flue channel. These tempered gases 81 are typically at about 550–600° C. Normally, this temperature is measured and the fan 79 speed controlled to maintain the desired temperature.

Alternatively, cooled gases 87 exiting the E-Batch module, can be recirculated 95 to provide the desired gas tempering. In this way, no extra oxygen is introduced to the system and no heat is lost due to the cold air infiltration.

Metallic ducts and flues can now handle these tempered gases. Tempered exhaust gas 81 then flows through stack 82 and duct 83. These ducts and stack will be well insulated to maintain the exhaust gas temperature. Fan 84 is provided to overcome the backpressure developed when gases flow through the E-Batch device. The passage of gases through the plurality of tunnels in the E-Batch requires a certain amount of pressure, but conventional fans commonly used for this purpose can handle this. The fan speed will be controlled in order to maintain proper pressure inside the combustion space 73 of the furnace. Stable pressure in the combustion space 73 is critical to the glass manufacturing process.

Alternatively, the fan can be located on the downstream side of the E-Batch module. Then it will be handling cooler and cleaner gases.

The stack 82 is provided with an emergency vent 85 and valve 86. In the case of malfunction of the E-Batch device, or failure of fan 84, the furnace exhaust gases must be quickly diverted to atmosphere. The glass furnace cannot be shut down or allowed to cool down, otherwise severe damage to the furnace will result. Upon a malfunction, the vent 85 quickly opens and valve 86 closes. A controller will then position the flaps of emergency vent 85, in order to maintain furnace operating pressure, since fan 84 will no longer be serving this purpose.

In normal operation, tempered gases 82 will discharge from fan 84 and enter inlet plenum 12 of the E-Batch preheater. The E-Batch preheater shown in FIG. 6 is consistent with the previous descriptions, but with further special aspects. Several banks of tunnels are provided, in this example a total of eight. Additional intermediate plenums 13 are thus provided. Cleaned and cooled gases 87 exit the E-Batch preheater from outlet plenum 14. A stack 89 discharges these gases 87 to atmosphere.

The use of multiple banks of tunnels allows for differing designs of each bank, in order to suit the requirements at that particular point of the process. As gases flow upward through the E-Batch preheater, they are cooled. As a result of this cooling, the actual volumetric gas flow decreases. Therefore, it will be desirable for the lower banks to include a greater number of tunnels than the upper banks, in order to provide optimum gas velocity in each bank of tunnels.

As well, the electrical characteristic of gases varies with temperature. Generally, at higher temperatures, the voltage required to produce adequate corona discharge decreases. Therefore, it will be desirable to provide independent high voltage power supplies 57 to individual banks of tunnels. In general, independent power supplies will be beneficial to operation of the process, since each power supply can be operated at a different voltage level, to produce the optimum operation at that point. However, it may prove to be cost effective to provide a few banks with a single power supply. The example here shows four power supplies for the eight banks of tunnels.

The final bank of tunnels 88 is provided with the greatest number of tunnels. It will be beneficial to reduce the gas velocity in this final bank to assure that virtually no batch dust is entrained in the gases leaving this bank, since these gases are discharged directly to atmosphere. As well, this final bank will be provided with its own high voltage power supply, so that optimum electrostatic operation is maintained at all times.

The E-Batch module is provided with a surge hopper 90 that holds batch material above its active sections. It is important that the top level of batch 92 in the surge hopper does not fall below the uppermost tunnel 93 in the E-Batch preheater. Batch material 17 is delivered to the top of the surge hopper by conventional material handling equipment 91, such as bucket elevators and belt conveyors. Typically, this equipment is intermittently operated, so the capacity of reservoir must be adequate to allow for the intervals between batch deliveries. As well, the capacity of the surge hopper must be sufficient to allow for batch to be fed to the furnace by feeder 4 during any period of time required to repair a failure of material handling equipment 91.

Hot batch from the bottom of the E-Batch module lower hopper 3 flows to the furnace-charging machine 4 by a gravity chute 94. Hot batch is dry and prone to generate fugitive dust emissions, so handling of this material is to be minimised. Hopper 3 and chute 94 are sealed in a dust-tight fashion. As well, hopper 3 and chute 94 will be well insulated to maintain temperature of the preheated batch.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for heating glass batch materials before use in a glass melting furnace, said glass batch material consisting of solid particle raw materials, cullet, or a mixture of the two, comprising the steps of:
   a) providing a bulk quantity of glass batch material in a hopper;
   b) providing at least one gas flow tunnel through the bulk quantity of batch material, at least a portion of the surface of said tunnel consisting of a free surface of said batch material;
   c) passing glass furnace exhaust gases through said tunnel;
   d) providing an electrically conductive electrode within said tunnel;
   e) providing an electrically conductive surface in contact with said batch material; and
   f) applying an electrical potential difference between said electrode of step d) and said surface of step e) of sufficient magnitude to produce corona discharge inside the tunnel, said corona discharge consisting of a flow of gaseous ions through the furnace gases, at least a portion of said gaseous ions flowing into the glass batch material.

2. The method of claim 1 wherein the gases flowing through the tunnel are at sufficient velocity so that at least some of the batch material would be entrained in the flowing gases if the electrical potential difference of step f) were not applied.

3. The method of claim 1 wherein the bulk electrical resistivity of said batch material is less than $10^8$ $\Omega$-meter.

4. The method of claim 1 including the additional steps of:
   a) removing heated batch material from the bottom of so that the batch material moves through the hopper by action of gravity.
   b) supplying unheated batch material to the top of said hopper.

5. The method of claim 4 wherein said batch material motion renewed surfaces of batch material in the tunnel.

6. The method of claim 1 wherein:
   a) said tunnel is of cylindrical shape and is generally horizontally disposed within the hopper;
   b) the top portion of the cylindrical tunnel consists of electrically conductive plates forming roofs within the bulk material;
   c) said roofs are arranged so that the bottom portion of the cylindrical tunnel consists of batch material residing at its angle of repose beneath the roofs; and
   d) said roofs of b) comprising the electrically conductive surface of claim 1, step e).

7. The method of claim 6 wherein said cylindrical tunnel is a hexagonal cylinder with an apex of the hexagon directed upward, the electrically conductive plates forming the two top and two side portions of the hexagonal cylinder, and the batch material forming the two bottom portions of the hexagonal cylinder.

8. The method of claim 6 wherein the top portion b) of the cylinder is a circular cylinder with a bottom section removed.

9. The method of claim 6 wherein the discharge electrode consists of a wire, a small radiussed bar, or a bar fitted with small radiussed points or edges, said discharge electrode being axially aligned and essentially centrally located within said cylinder.

10. The method of claim 6 comprising of a plurality of said tunnels, thus forming a bank of said tunnels, said furnace gases being divided to flow through said tunnels in parallel.

11. The method of claim 10 further comprising:
   a) a plurality of said banks of tunnels located one above another;
   b) said gases being directed to flow first through the bottom-most bank, then successively through each vertically adjacent bank; and
   c) heated batch material is removed from the bottom of said hopper and unheated batch material is added to the top of said hopper in a substantially continuous fashion, so that the batch material moves through the hopper by action of gravity.

12. The method of claim 1 wherein the glass furnace exhaust gases contain particulate matter and at least a portion of said particulate matter is electrostatically precipitated from the gases onto the inside surface of said tunnel.

13. The method of claim 1 wherein said glass furnace exhaust gases contain a gaseous pollutant, said batch material is at least partially comprised of a constituent that is chemically reactive with said pollutant, and at least some of said gaseous pollutant is removed from said furnace exhaust gases by reaction with said batch material constituent.

14. The method of claim 13 wherein the gaseous pollutant is sulphur dioxide and the batch constituent is soda ash or limestone.

15. The method of claim 13 wherein the gaseous pollutant is hydrogen chloride and batch constituent is soda ash or limestone.

16. The method of claim 13 wherein the gaseous pollutant is hydrogen fluoride and batch constituent is soda ash or limestone.

17. An apparatus for heating glass batch materials before use in a glass melting furnace, said glass batch material consisting of solid particle raw materials, cullet, or a mixture of the two, comprising:
   a) a bulk quantity of glass batch material contained in a hopper;
   b) at least one gas flow tunnel through the bulk quantity of batch material, at least a portion of the surface of said tunnel consisting of a free surface of said batch material;
   c) means to pass glass furnace exhaust gases through said tunnel;
   d) an electrically conductive electrode within said tunnel;
   e) an electrically conductive surface in contact with said batch material; and
   f) means to apply an electrical potential difference between said electrode of step d) and said surface of step e) of sufficient magnitude to produce corona discharge inside the tunnel, said corona discharge consisting of a flow of gaseous ions through the furnace gases, at least a portion of said gaseous ions flowing into the glass batch material.

18. The apparatus of claim 17 wherein the gases flowing through the tunnel are at sufficient velocity so that at least some of the batch material would be entrained in the flowing gases if the electrical potential difference of step f) were not applied.

19. The apparatus of claim 17 wherein the bulk electrical resistivity of said batch material is less than $10^8$ Ω-meter.

20. The apparatus of claim 17 further including:
   a) means to remove heated batch material from the bottom of said so that the batch material moves through the hopper by action of gravity; and
   b) means to add unheated batch material to the top of said hopper.

21. The apparatus of claim 20 wherein said batch material motion provides renewed surfaces of batch material in the tunnel.

22. The apparatus of claim 17 wherein:
   a) said tunnel is of cylindrical shape and is generally horizontally disposed within the hopper;
   b) the top portion of the cylindrical tunnel consists of electrically conductive plates forming roofs within the bulk material;
   c) said roofs are arranged so that the bottom portion of the cylindrical tunnel consists of batch material residing at its angle of repose beneath the roofs; and
   d) said roofs of b) comprising the electrically conductive surface of claim 17, item e).

23. The apparatus of claim 22 wherein said cylindrical tunnel is a hexagonal cylinder with an apex of the hexagon directed upward, the electrically conductive plates forming the two top and two side portions of the hexagonal cylinder, and the batch material forming the two bottom portions of the hexagonal cylinder.

24. The apparatus of claim 22 wherein the top portion b) of the cylinder is a circular cylinder with a bottom section removed.

25. The apparatus of claim 22 wherein the discharge electrode consists of a wire, a small radiussed bar, or a bar fitted with small radiussed points or edges, said discharge electrode being axially aligned and centrally located within said cylinder.

26. The apparatus of claim 22 comprising of a plurality of said tunnels, thus forming a bank of said tunnels, said furnace gases being divided to flow through said tunnels in parallel.

27. The apparatus of claim 26 further comprising:
   a) a plurality of said banks of tunnels located one above another;
   b) means to direct the flow of said gases first through the bottom-most bank, then successively through each vertically adjacent bank;
   c) means to remove heated batch material from the bottom of said so that the batch material moves through the hopper by action of gravity;
   d) means to supply unheated batch material to the top of said hopper.

28. The apparatus of claim 17 wherein the glass furnace exhaust gases contain particulate matter and at least a portion of said particulate matter is electrostatically precipitated from the gases onto the inside surface of said tunnel.

29. The apparatus of claim 17 wherein said glass furnace exhaust gases contain a gaseous pollutant, said batch material is at least partially comprised of a constituent that is chemically reactive with said pollutant, and at least some of said gaseous pollutant is removed from said furnace exhaust gases by reaction with said batch material constituent.

30. The method of claim 29 wherein the gaseous pollutant is sulphur dioxide and the batch constituent is soda ash or limestone.

31. The method of claim 29 wherein the gaseous pollutant is hydrogen chloride and batch constituent is soda ash or limestone.

32. The method of claim 29 wherein the gaseous pollutant is hydrogen fluoride and batch constituent is soda ash or limestone.

* * * * *